United States Patent [19]

Riegler et al.

[11] 4,265,136

[45] May 5, 1981

[54] TORQUE SUPPORT ARRANGEMENT

[75] Inventors: Ernst Riegler, Enns; Manfred Schmidt, Linz, both of Austria

[73] Assignee: Voest-Alpine Aktiengesellschaft, Linz, Austria

[21] Appl. No.: 973,146

[22] Filed: Dec. 26, 1978

[30] Foreign Application Priority Data

Jan. 10, 1978 [AT] Austria ................................ 160/78

[51] Int. Cl.³ ........................ F16H 35/00; C21C 5/50
[52] U.S. Cl. ...................................... 74/380; 74/410; 248/550; 266/245; 266/276
[58] Field of Search ................ 266/245, 276; 248/550, 248/188.3; 74/337, 380, 410, 751; 91/171; 92/161

[56] References Cited

U.S. PATENT DOCUMENTS

| 1,357,674 | 11/1920 | Alquist | 74/410 |
| 3,281,101 | 10/1966 | May | 248/22 |
| 3,548,678 | 12/1970 | Phillips | 74/665 |
| 3,587,338 | 6/1971 | Henriot | 74/410 |

FOREIGN PATENT DOCUMENTS

| 1222756 | 8/1966 | Fed. Rep. of Germany. | |
| 1923384 | 4/1970 | Fed. Rep. of Germany. | |
| 2414487 | 10/1975 | Fed. Rep. of Germany | 74/410 |
| 1522323 | 3/1968 | France. | |
| 450091 | 4/1968 | Sweden. | |
| 525755 | 11/1976 | U.S.S.R. | 266/245 |

Primary Examiner—C. J. Husar
Assistant Examiner—Conrad Berman
Attorney, Agent, or Firm—Brumbaugh, Graves, Donohue & Raymond

[57] ABSTRACT

In a torque support arrangement for a gear mounted so as to be movable about a pivot axis, wherein the gear is supported against the base on both sides of the pivot axis by an elastic supporting arrangement, the supporting arrangement includes a pressure-medium piston-cylinder to which pressure gas is admitted and whose position relative to the base is adjustable by means of an adjustment device.

11 Claims, 7 Drawing Figures

TORQUE SUPPORT ARRANGEMENT

BACKGROUND OF THE INVENTION

The invention relates to a torque support for a gear mounted so as to be movable about a pivot axis, in particular for a converter drive, wherein the gear casing is supported against the base on both sides of the pivot axis by an elastic supporting arrangement.

A torque support of this kind for converter drives is known from U.S. Pat. No. 3,548,678. This torque support comprises elastic supporting arrangements arranged between a piston supporting the gear casing, and the base, such as for instance rubber plates, by which impacts appearing during operation are elastically accommodated. A disadvantage with this known torque support, however, is the fact that the gear casing, after the switching on of the tilting drive, will assume and retain a slanted position according to the elasticity of the rubber plates. This leads to horizontally directed and unpredeterminable force components that affect the pistons and the rubber plates in addition to the vertical forces resulting from the impact forces and the torque to be transmitted. Moreover, when the gear casing has already assumed a slanted position due to a torque, and the elastic supporting arrangement has been strained to the limits of its strain capacity, further elastic accommodation of impacts is no longer possible. The impacts will then directly affect the gear. Because of the slanted position of the gear, there furthermore exists the danger that the reduction gears will run dry, since the latter normally are equipped with an immersion lubrication.

SUMMARY OF THE INVENTION

The invention aims at avoiding these disadvantages and difficulties and has as its object to provide a torque support of the initially-defined kind by which, despite the elastic support, a horizontal position of the gear during its operation is ensured. Slanting of the gear is to appear only as a result of impact loads, as is the case, for instance, when switching on the gear. Such slanting is, however, to occur only during the action of the impact forces, whereas the horizontal operating position of the gear at full torque transmission is to be adjustable anew after a short span of time.

This object is achieved according to the invention in that as an elastic supporting arrangement, a pressure-medium piston-cylinder is provided, to which pressure gas is admitted and whose position relative to the base is adjustable by means of an adjustment device.

An advantageous embodiment is characterized in that the piston of the pressure-medium piston-cylinder is designed as a double-acting floating piston. The end of the piston that is remote from the cylinder to which pressure gas is admitted is guided in a second cylinder to which hydraulic liquid is admitted. The piston being adjustable relative to the base by alteration of the amount of liquid within the hydraulic cylinder.

Suitably, at least two pressure-medium piston-cylinders are provided, which devices are arranged in a vertical plane perpendicular to the pivot axis and are symmetrically positioned relative to the pivot axis. At least one balancing conduit interconnects the cylinders. Advantageously, the cylinders are connected in a conduit-like manner by two balancing conduits, each having a non-return valve acting in the opposite direction of the other. The conduits each enter the cylinder below the upper end position of the pistons.

For a fully automatically controlled mode of operation of the torque support, according to a further embodiment of the invention, a levelling switch is provided at the gear casing in the vertical plane laid through the pivot axis. This switch, when the position of the gear casing deviates from the desired horizontal position, opens a valve in a conduit that supplies hydraulic medium into the hydraulic cylinder, whereby the piston is displaced due to the increase in the volume of fluid and the casing consequently is returned to the desired horizontal position.

It is furthermore suitable to have a resting position of the piston within the hydraulic cylinder marked by a position transmitter, and a pressure-dependent valve in a return conduit for the hydraulic cylinder. The position transmitter and the pressure-dependent valve are connected by a control conduit.

For accommodating horizontal force components at the torque support, as they appear even with the slightest slanted positions, the pressure-medium piston-cylinders at their upper ends may comprise spherically designed face sections, which, if desired, are coated with bronze or a PTFE-layer. Suitably, a pump for the hydraulic system can be switched on and off only together with an on and off switching arrangement regulating the gear-drive.

BRIEF DESCRIPTION OF THE DRAWINGS

The invention will be explained in more detail by way of several embodiments and with reference to the accompanying drawings, wherein.

DESCRIPTION OF ILLUSTRATIVE EMBODIMENTS

Figure 1:
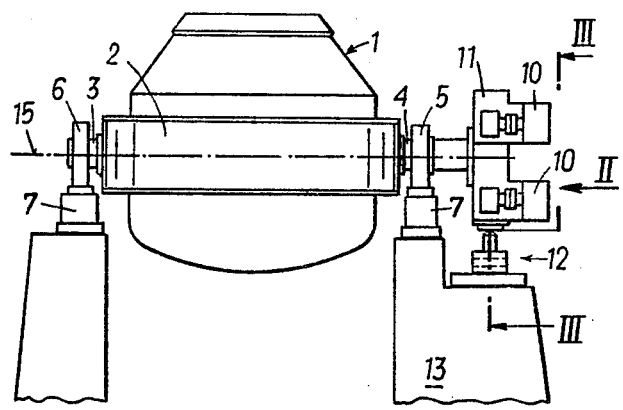
FIG. 1 is a side view of a converter.
Figure 2:
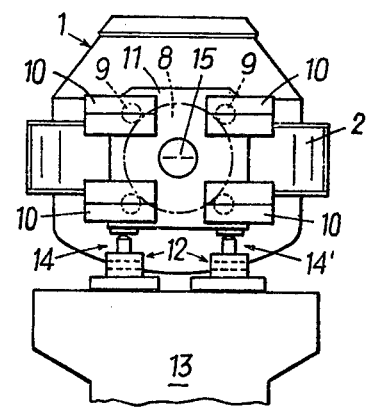
FIG. 2 is a front view of a converter in schematical illustration.

A converter 1 is inserted in a carrying ring 2. The carrying ring is tiltably mounted with carrying trunnions 3 and 4 in a fixed bearing 5 and an expansion bearing 6, the bearings 5 and 6 being mounted to bearing supports 7. The carrying trunnion 4 is extended beyond the bearing 5 and carries at its end a spur gear wheel 8 which is drivable by four pinions 9 distributedly arranged about its circumference. The pinions, together with their reduction gears and drives 10, are fastened to a drive casing 11 which encloses the spur gear wheel and which is pivotably mounted on the carying trunnion 4. The gear casing 11 is supported on a base 13 via a torque support generally denoted by 12.

The torque support comprises two support units 14, 14', which are provided on both sides of the vertical plane laid through the tilting axis 15, and symmetrically positioned relative thereto. Each support unit comprises a double-acting piston 16, 16' whose longitudinal axis is vertically arranged. The upper end of each piston is surrounded by a cylinder 17, 17', and each lower end has an enlarged face, as compared to the upper end which is vertically guided in a cylinder 18, 18' rigidly fastened on the base 13. In this way, each of the pistons 16, 16' is floatingly arranged between the cylinders 17, 18 and 17', 18', respectively. The cylinders 17, 17' are filled with compressed air and are in connection with each other via two balancing conduits 19, 19', each of which is equipped with a non-return valve 20, 20' acting in the opposite direction. One of the balancing conduits in addition is connected with a compressor arrangement (not illustrated) and with an air vessel 21. The cylinders 18, 18' are filled with a hydraulic liquid 22, which is suppled from a storage container 24 via supply conduits 25, 25' by means of a pump 23. The supply conduits 25, 25' are lockable by means of electrically operable valves 26, 26'. Actuation of these valves 26, 26' is effected by end switches 27, 27' arranged on the gear casing on both sides of the tilting axis 15. If the valves 26, 26' within the supply conduits are closed or if the pump 23, which is always operating during actuation of the tilting drive, supplies more fluid to the cylinders 18, 18' than is allowed to flow thereinto, the surplus of hydraulic liquid is transported back into the storage container 24 via a conduit 28 and a pressure regulating valve 29. Each of the cylinders 18, 18' at a predetermined height include a position transmitter 30, 30' for marking the positions of the pistons 16, 16', by which transmitters 30, 30' pressure-dependent return valves 31, 31', each provided in a return conduit 32, 32' leading from the cylinder 18, 18' into the storage vessel 24, can each be actuated.

The cylinders 17, 17' each have, at their upper sides, a spherically designed face 33, 33' provided with bronze or a PTFE-layer. This spherical face is in contact with hardened supporting plates 34, 34' that are arranged at the lower side of the gear casing 11 on both sides of, and symmetrically positioned relative to, the tilting axis 15.

Figure 3:
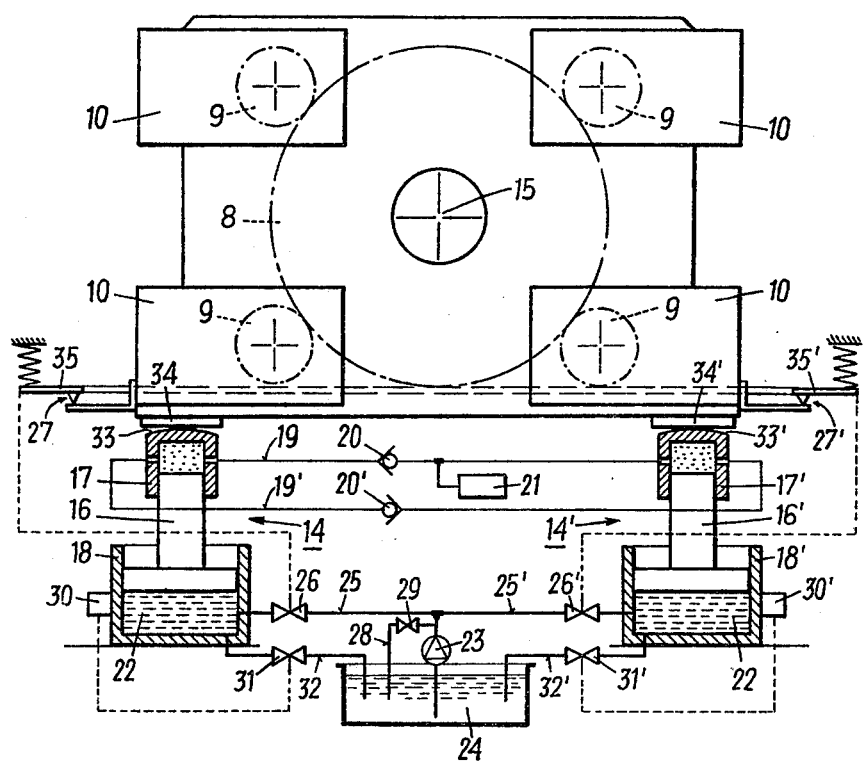
FIG. 3 shows the torque support sectioned along line III—III of FIG. 1, also in schematical illustration.
Figure 6:
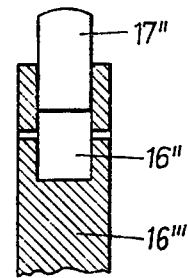

In FIG. 6 a modified embodiment is illustrated in which, instead of the cylinder 17 according to FIG. 3, a piston 17" is inserted in a recess 16" at the upper end of a piston 16'''.

The torque support functions in the following way:

When starting the gear, hydraulic liquid 22 is first pumped, by means of a pump 23, from the storage container 24 into the hydraulic cylinders 18 and 18', with the valves 26, 26' open and the return valves 31, 31' closed. The pump 23 is coupled with the on and off switching arrangement for the electric drive of the gear in such a way that its operation is always started together with the drive, so that, when actuating the tilting drive, the hydraulic system is under pressure. Simultaneously with the starting operation, compressed air is introduced by means of the compressor arrangement into the compressed-air cylinders 17, 17' via the air vessel 21, until these cylinders with their spherical faces 33, 33' contact the hardened supporting plates 34, 34'. Due to the balancing conduits 19, 19', the same pressure prevails in both cylinders 17, 17'.

Hydraulic liquid is introduced into the hydraulic cylinders 18, 18' until the end switch 27 or 27' accorded to each cylinder 18 or 18' is closed, the valves 26, 26' thus being switched into the closed position. The hydraulic liquid is then transported through the pump 23 via the conduits 28, directly into the storage container 24. The supply conduits 25, 25', however, are still under pressure as far as to the valves 26, 26'.

The arrangement of the end switches 27, 27' at the gear casing 11 is chosen such that the gear casing will be horizontally aligned at the moment of closure of the two end switches. Movement of the gear casing upwards and downwards, as is for instance the case because of the inclination of the carrying trunnions on account of the converter weight, is made possible without losing contact between the spherical faces 33, 33' and the corresponding supporting plates 34, 34' by choosing the pressure within the compressed-air cylinders 17, 17' such that even with a maximally lifted gear casing a contact of the compressed-air cylinders with the gear casing is ensured. Contact plates 35, 35' are pressed downwards via springs relative to the base so that the two end switches 27, 27' will always remain closed even with the gear casing 11 lifted or lowered, if the latter is in the horizontal position. The contact plates 35, 35', however, always carry out a vertical movement only synchronously on account of a coupling (not illustrated), i.e., they will always be at the same height. Due to the fact that both contact plates 35, 35' are resiliently pressed down, at least one end switch will always be closed (e.g. with the gear casing pivoted out of the desired horizontal position), the contact plate of the end switch oppositely arranged from the closed end switch being always at the same height as the contact plate of the closed end switch.

Figure 4:
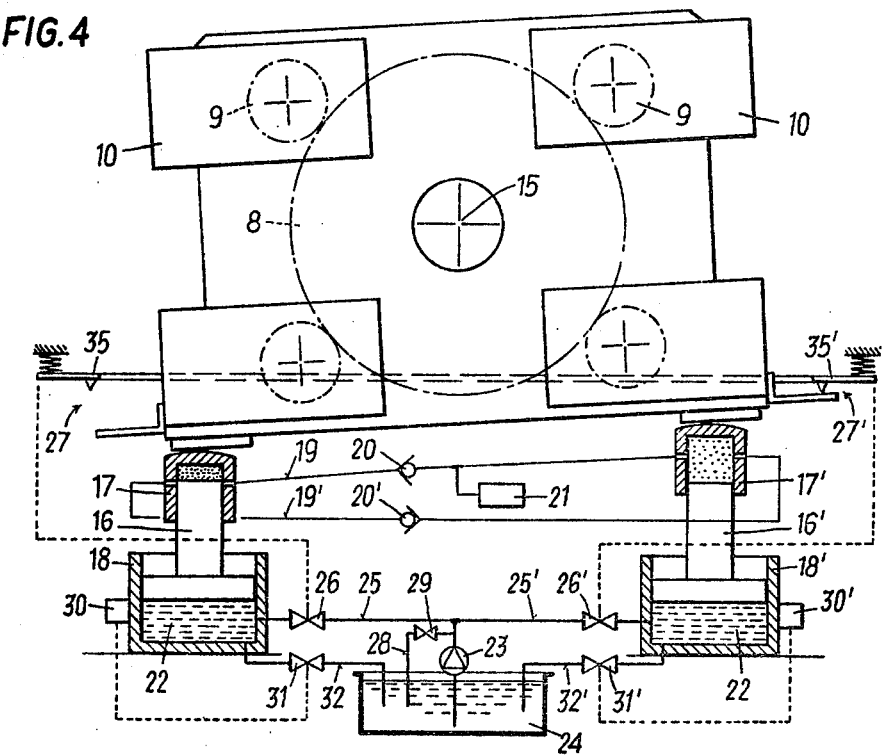
FIGS. 4 and 5 illustrate, in a representation analogous to FIG. 3, the mode of operation of the embodiment of the torque support illustrated in FIG. 3, FIG. 6 gives a detail of a modified embodiment of a torque support.
Figure 5:
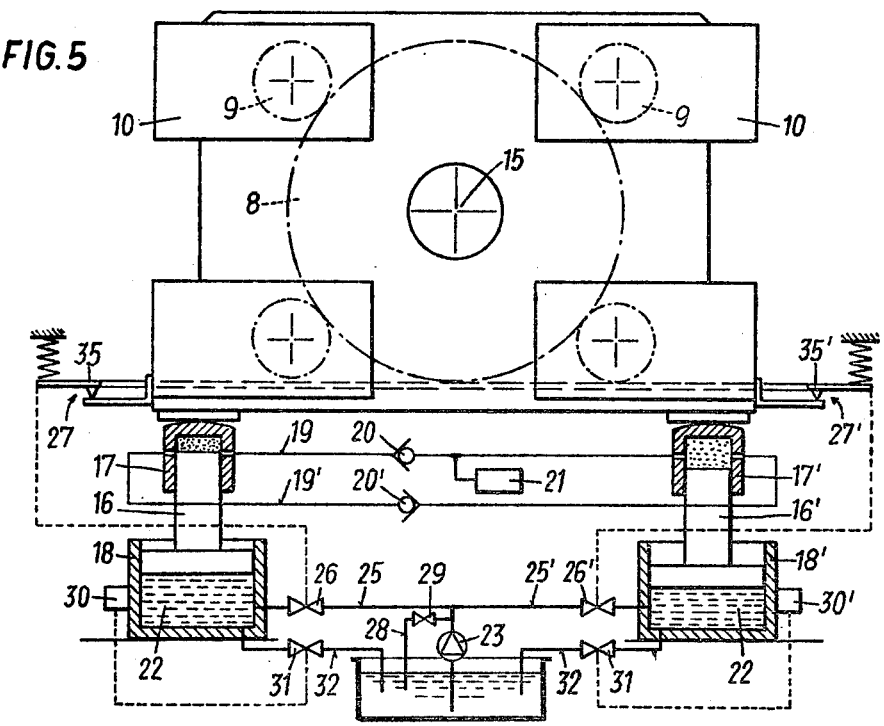

If the converter 1 is tilted, for instance, in the clockwise direction, the gear casing is pivoted about the tilting axis 15 in a counter-clockwise direction by the reaction forces acting against the drive moment, which is illustrated in FIG. 4 in a considerably exaggerated way. The supporting plate 34 then presses towards the cylinder 17, which is thereby moved downwards. The cylinder 17', however, is moved up by the expanding compressed air. The balancing conduits 19, 19' enter the cylinders 17, 17' at such a height that, if one of the cylinders 17, 17' is pressed against the piston 16, 16', the entrances of the balancing conduits are blocked by the respective piston 16, 16', so that a residual compressed air volume will remain which cannot escape via the balancing conduits. Thereby, touching down of the cylinders 17, 17' on the pistons 16, 16' is prevented. As can be seen from FIG. 4, the end switch 27 is opened, whereas the end switch 27' remains closed due to the spring-mounting of the contact plate 35'. Opening of the end switch 27 causes an opening of the valve 26, whereby hydraulic liquid may stream into the hydraulic cylinder 18 until the piston 16 has been moved upward to the point where the contact at the end switch 27 is closed again. This is the case when the gear casing has regained its horizontal operating position, as is illustrated in FIG. 5. The gear casing remains in the position illustrated in FIG. 5 as long as the torque acts thereupon.

When changing the direction of rotation or when switching off the drive, the pressure within the hydraulic cylinder 18 decreases to a minimum value, whereby the pressure-dependent return valve 31 is opened and hydraulic liquid flows back via the return conduit 32, into the storage container. It remains opened until the piston 16 has reached the height of the position transmitter 30, which then causes the closing of the return valve 31. The horizontal position of the gear casing is thus further ensured.

With adequate dimensioning of the torque support according to the invention, it is possible to restrict the pivot movement of the gear from the desired horizontal position, to a maximum of ±1°.

Figure 7:
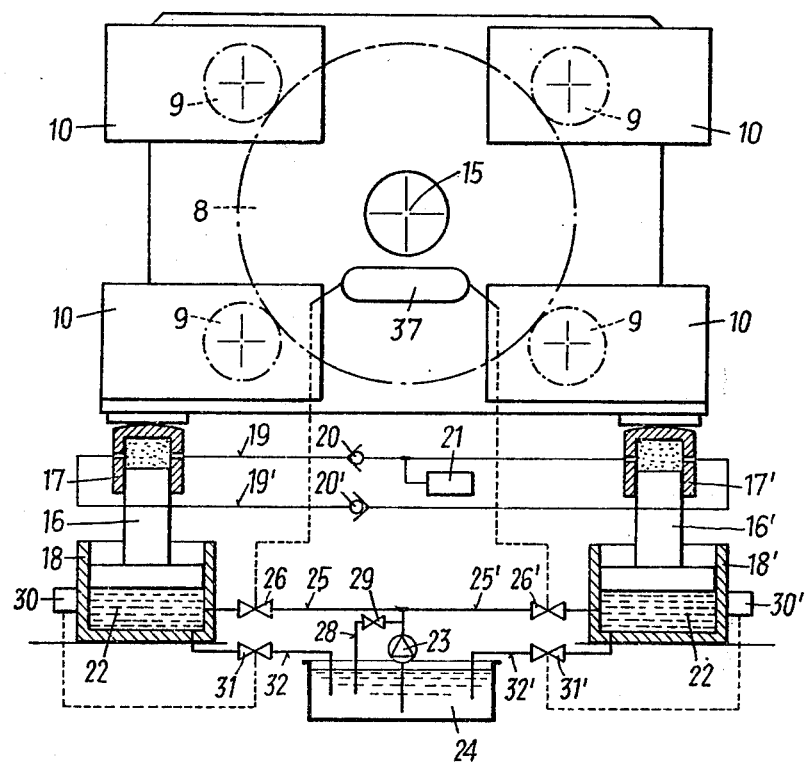
FIG. 7 illustrates a further modified embodiment in a way analogous to FIG. 3.

The two end switches 27, 27' suitably are combined into a single double-acting levelling switch 37, for instance a mercury electrode switch, which will create a contact in depending on the deviation of its respective position from the horizontal. A switch of this kind, illustrated in FIG. 7, which is fastened to the gear casing in the vertical plane laid through the tilting axis 15, indicates deviations of the gear casing from the horizontal position in both directions and actuates one of the valves 26, 26′ according to the inclination direction of the gear casing, in the same way as the two end switches 27, 27′.

The invention is not limited to multi-pinion converter drives, it can also be realized with drives having only one pinion. Furthermore, it is possible to apply the invention to gears which are not pivotable about a certain axis that is defined in space, such as, for instance, gears that are hinged to the base by means of connecting rods.

What we claim is:

1. In a torque support arrangement for a gear, in particular for a converter drive, mounted so as to be movable about a pivot axis, and of the type including a base, a gear casing, and elastic supporting means provided for supporting said gear casing against said base on both sides of the pivot axis, the improvement which is characterized in that said elastic supporting means are designed as pressure-medium-piston-cylinder-means to which pressure gas is admitted, and that adjustment means are provided for adjusting the position of said pressure-medium-piston-cylinder-means relative to said base.

2. In a torque support arrangement for a gear, in particular for a converter drive, mounted so as to be movable about a pivot axis, and of the type including a base, a gear casing, and elastic supporting means provided for supporting said gear casing against said base on both sides of the pivot axis, the improvement which is characterized in that:

said elastic supporting means are designed as pressure-medium piston-cylinder means to which pressure gas is admitted, said pressure-medium piston-cylinder means include a piston and a first cylinder admittable with said pressure gas, said piston being designed as a double-acting floating piston, said double-acting floating piston having a first end and a second end, said first end being arranged in said first cylinder; and adjustment means are provided for adjusting the position of said pressure-medium piston-cylinder means relative to said base, said adjustment means being designed as a second cylinder admittable with an amount of hydraulic liquid, said second end of said piston being guided in said second cylinder, said double-acting floating piston being displaceable relative to said base by changing the amount of hydraulic liquid in said second cylinder.

3. A torque support arrangement as set forth in claim 2, further comprising
a levelling switch provided at said gear casing in the vertical plane laid through said pivot axis,
a conduit for supplying hydraulic liquid to said second cylinder, and
a valve provided in said conduit, said levelling switch opening said valve when the position of said gear casing deviates from the desired horizontal position, so as to supply said hydraulic liquid into said cylinder, a certain pressure prevailing in said first cylinder, said piston being displaceable upon an increase of said liquid in said second cylinder and said gear casing, as a consequence, being pivotable in the direction opposite the deviation until the desired horizontal position is regained.

4. A torque support arrangement as set forth in claim 2, further comprising
a position transmitter for marking a resting position of said piston in said second cylinder,
a return conduit provided for said second cylinder,
a pressure-dependent valve, which opens at a certain minimum pressure, provided in said return conduit, and
a control conduit means connecting said position transmitter and said pressure-dependent valve, for closing said valve when said piston reaches said resting position.

5. A torque support arrangement as set forth in claim 2, further comprising a gear drive, an on and off switching arrangement regulating said gear drive, and a pump for said hydraulic liquid, said pump being capable of being switched by said switching on and off arrangement only together with said gear drive.

6. In a torque support arrangement for a gear, in particular for a converter drive, mounted so as to be movable about a pivot axis, and of the type including a base, a gear casing, and elastic supporting means provided for supporting said gear casing against said base on both sides of the pivot axis, the improvement which is characterized in that:

said elastic supporting means are designed as pressure-medium piston-cylinder means to which pressure gas is admitted, said pressure-medium piston-cylinder means includes at least two pressure-medium piston-cylinders, said at least two pressure-medium piston-cylinders being arranged in a vertical plane perpendicular to said pivot axis and positioned symmetrically with respect to said pivot axis, and each of said pressure-medium piston-cylinders having a piston and a cylinder admittable with said pressure gas;

at least one balancing conduit is provided for interconnecting the cylinders admittable with said pressure gas; and adjustment means are provided for adjusting the position of said pressure-medium piston-cylinder means relative to said base.

7. A torque support arrangement as set forth in claim 6, further comprising at least two balancing conduits for interconnecting said cylinders admittable with said pressure gas in a conduit-like manner, each of said at least two balancing conduits including a non-return valve acting in directions opposite each other, said at least two balancing conduits each entering said cylinders admittable with said pressure gas below the upper end position of the piston of each of said at least two pressure-medium piston-cylinders.

8. A torque support arrangement as set forth in claim 6, wherein said at least two pressure-medium piston-cylinders at their upper ends, have spherically designed face sections.

9. A torque support arrangement as set forth in claim 8, wherein said spherically designed face sections are coated with bronze.

10. A torque support arrangement as set forth in claim 8, wherein said spherically designed face sections are coated with a PTFE-layer.

11. A torque support arrangement as set forth in claim 6, further comprising an air vessel interposed in said at least one balancing conduit between said at least two pressure-medium piston-cylinders.

* * * * *